(No Model.)
W. M. FRANK.
SEED DROPPER FOR CORN PLANTERS.
No. 557,987. Patented Apr. 7, 1896.
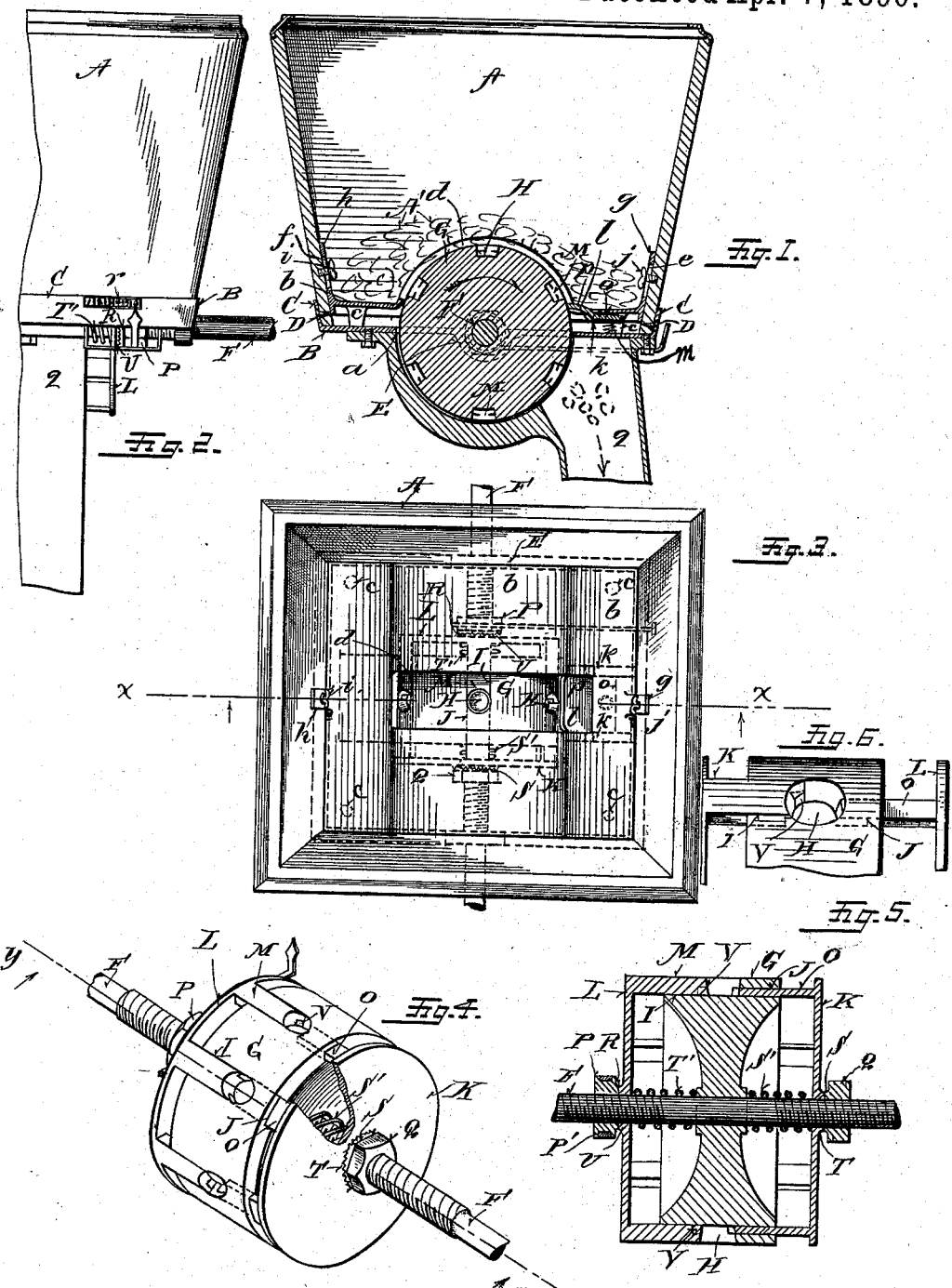
Witnesses
Jas. C. Dawley
W. M. McNair
William M. Frank, Inventor
By his Attorney
H. A. Toulmin under an obstruction.
UNITED STATES PATENT OFFICE.

WILLIAM M. FRANK, OF SPRINGFIELD, OHIO.

SEED-DROPPER FOR CORN-PLANTERS.

SPECIFICATION forming part of Letters Patent No. 557,987, dated April 7, 1896.

Application filed August 7, 1895. Serial No. 558,471. (No model.)

*To all whom it may concern:*

Be it known that I, WILLIAM M. FRANK, a citizen of the United States, residing at Springfield, in the county of Clark and State of Ohio, have invented certain new and useful Improvements in Seed-Droppers for Corn-Planters, of which the following is a specification, reference being had therein to the accompanying drawings.

This invention relates to certain new and useful improvements in seed-droppers for corn-planters.

The particular objects which I have in view are, first, means for regulating the amount of seed dropped without the use of interchanging gears ordinarily used and without removing the seed from the seed receptacle or hopper when it is desired to plant a less number or a greater number of kernels to a hill; second, devices for holding the adjusting-disks in adjusted position, so that when once adjusted a definite number of kernels of grain will be sown, and have reference to points of detail hereinafter appearing.

In the accompanying drawings, on which like reference-letters indicate corresponding parts, Figure 1 is a sectional view taken on the line *x x* of Fig. 3, looking in the direction of the arrow; Fig. 2, a partial rear view of the same; Fig. 3, a plan view; Fig. 4, a perspective view of the dropper mechanism, partly broken away; Fig. 5, a sectional view on the line *y y* of Fig. 4; Fig. 6, a detail view of a portion of the dropper-disk and the fingers or projections for closing the pockets.

The letter A represents a seed receptacle or hopper adapted to be mounted upon the frame of a corn-planter in any convenient manner, and the letter B a rigid bottom therefor, having upturned edges C, secured to the hopper by screws D or otherwise. This bottom is bent downward at E to receive the shaft F and form bearings for the same. Upon this shaft F is rigidly mounted a dropper-disk G, which extends up through a slot *a* in the bottom B into the seed-receptacle. A false bottom *b*, having lugs or projections *c* cast or otherwise secured thereto, is placed within the receptacle and rests on the bottom proper, B. This false bottom has a slot *d*, as seen in Figs. 1 and 3, through which the corn drops into suitable pockets H, formed on the periphery of said dropper-disk. This false bottom is also provided with slots *e* and *f* on its turned-up edges *g h*, so that it may be slightly adjusted up or down in order to make the bottom perfectly level. Thumb-screws *i j* pass through the slots *e* and *f* and screw into the sides of the hopper.

When it is desired to remove the bottom, should any obstruction prevent the shaft and disk from freely turning, the thumb-screws are unscrewed and the bottom readily removed. Lugs *k k* also project downward from this false bottom and have pivoted between them a cut-off *l*, which has a spring *m* underneath its rear extension *o*. This causes the forward extension *p* to press downward on the face of the dropping-disk, and thus prevent the grain from dropping from the pockets H or from the hopper A down through the slot *d*, but will at the same time allow a kernel of corn or other seed projecting slightly above the surface of the disk to pass downward into the spout *q*.

It will be observed that the shaft F may be driven in any convenient manner, such as by a pulley, belt, or sprocket-wheel or gear attachment used in ordinary corn-planters.

Referring again to the dropper-disk G, it will be seen that the pockets H formed on the periphery are slightly tapered or flared. This is for the purpose of the better discharge of the grain taken into them. The dropper-disk G also has grooves I in its periphery and slots J in line with said grooves and said pockets slightly below the surface of the periphery of said dropper-disk. On either side of said disk and also mounted on the shaft F are regulating-disks K and L, respectively, which have fingers or projections M and O, cast or otherwise secured thereto. These fingers or projections of the respective regulating-disks are adapted to fit into the grooves I and slots J. When it is desired to close the pockets H, the regulating-disks K and L are brought up to the dropper-disk faces, respectively, by means of nuts P and Q, adapted to be screwed upon the shaft F. It will be seen that these nuts have ratchet-faces R and S and are adapted to mesh with ratchets T and U on the outer faces of the disks K and L. In order to hold these ratchet-faces in engagement with each other and to press the regulating-disks outward from the dropper-disk when the nuts are loosened, springs S' and T' are adapted to press outward on the regulating-disks, as seen in Fig. 5. Thus when the disks are set in any position desired for the amount of feed-opening in the pockets to sow the correct amount of seed, the springs S' and T' hold the regulating-disks into mesh with the nuts and hold said nuts in their set position, so that no variation can take place in the amount of opening in the pockets on the dropper-disk by reason of the nuts unscrewing from any cause. It will also be observed that the nut P has a groove or channel P' extending around it. An indicator having a pointer at one end and a fork at the other adapted to fit about the nut in said groove moves along longitudinally with said nut and indicates the number of kernels to be planted on an indicator-scale properly graded and marked with numerals, the various numerals indicating the number of kernels the machine will drop when the indicator is set on any number on the scale. It will also be observed that this indicator is used for the regulating-disk L alone. This disk is set in or out according to the number of kernels of corn to be sown; but the disk K is turned clear in or clear out when it is desired to limit the depth of the pockets for sowing one grain at a time or for opening the pocket to its full depth, and thus no indicator is necessary for the indicator-disk K, as it is opened or closed to either entirely cover the bottom of the pockets H or form a portion of their circular surface.

Referring now to the finger or projection M, it will be seen that at its inner end it is rounded out to correspond to the shape of the pockets H and is cut back at its lower portion, as shown at V in Figs. 5 and 6. This cut-away portion admits the finger J, so that the latter, when it is drawn inward to its fullest extent, will fit into this cut-away portion. Thus the entire depth of the pockets is reduced and but one seed is allowed to be planted at a time. This arrangement is used when it is desired to plant the seeds in drills one at a time.

In operating my seed-dropper attachment the corn, as indicated at A', is placed in the hopper A and the shaft and dropper-disk rotated in the direction of the arrow, as shown in Fig. 1. The pockets H on said dropper-disk receive the corn or other grain to be planted and deposit it in the tube or spout q, which latter leads directly to the ground or to an automatic opening and closing receptacle, which may be operated by an ordinary check-row, by hand, or in any convenient manner.

If it is desired to sow a large number of kernels of corn, the disk K with its fingers is set away from the dropper-disk G, so as to expose the entire surface of the pockets H, and the regulating-disk K is also set away from the disk G, so that the full depth of the pocket may be adapted to receive corn. Now when it is desired to simply plant a less number of grains in a hill the disk K is screwed up closer to the disk F, so that the pockets are slightly closed. If desired to sow but one grain and that one in drills, the disk K alone is screwed up to the disk G. Thus it will be seen that with my device I may either sow a number of kernels in a hill or I may drill in one at a time.

Having thus fully described my invention, what I claim as new, and desire to secure by Letters Patent, is—

1. In a seed-dropper for a corn-planter, a dropper-disk mounted on a shaft and having pockets on its periphery, and a device for lessening the depth of all of said pockets simultaneously and another device for opening and closing all of said pockets simultaneously, both of said devices being also axially adjustable to and from said dropper-disk.

2. In a seed-dropper for a corn-planter, the combination with a seed-receptacle and a vertical dropping-disk working in the lower part thereof, a false bottom secured to and inside of said receptacle, and slotted to expose the upper part of said disk, said slot at one side being carried beyond said disk, and a cut-off, in part, under said false bottom and pivoted thereto, and in part, extending through said slot and up to said disk, and a spring acting on the cut-off to keep it in yielding contact with the disk.

3. In a seed-dropper for a corn-planter, the combination with a seed-receptacle, a shaft carried thereby, a dropper-disk mounted on said shaft and rotated thereby, one or more pockets on the periphery of said disk, grooves and slots respectively extending from each pocket to the faces of said disk, regulating-disks mounted on said shaft and having fingers or projections to fit said grooves and slots in said dropper-disk, and means for moving one or both of said regulating-disks longitudinally on said shaft whereby the pockets in the dropper-disk may be opened or closed and made shallower or deeper.

4. In a seed-dropper for a corn-planter, the combination with a seed-receptacle, a slotted adjustable false bottom therefor, and a rotatable shaft carried by said receptacle, a dropper-disk having pockets and grooves on its periphery and slots in line with said grooves, of regulating-disks slidably mounted on said shaft, nuts screwed onto said shaft and adapted to force each regulating-disk up to the dropper-disk whereby the pockets in the latter are closed more or less or made shallower or deeper, a ratchet-face on the outer face of each regulating-disk engaging with a matching ratchet-face on the nuts, and a spring between each regulating-disk and the dropper-disk to cause the ratchet-faces on the regulating-disks and the nuts to intermesh, whereby the latter are held in any adjustable position on the shaft and the regulating-disks prevented from varying the opening in the pockets on the dropper-periphery.

In testimony whereof I affix my signature in presence of two witnesses.

WILLIAM M. FRANK.

Witnesses:
GEO. ARTHUR,
W. M. MCNAIR.